US 12,083,641 B1

(12) United States Patent
Wang (10) Patent No.: US 12,083,641 B1
(45) Date of Patent: Sep. 10, 2024

(54) EDGE GUIDE

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 18/600,946

(22) Filed: Mar. 11, 2024

(51) Int. Cl.
*B23Q 1/03* (2006.01)
*B23Q 3/00* (2006.01)
*B25H 1/00* (2006.01)

(52) U.S. Cl.
CPC .............. *B23Q 1/03* (2013.01); *B23Q 3/005* (2013.01); *B25H 1/0078* (2013.01)

(58) Field of Classification Search
CPC ...... B23Q 16/001; B23Q 3/002; B23Q 3/005; B23Q 3/069; B25H 1/0078; B25H 1/08; B25H 1/0085; G01B 5/242
See application file for complete search history.

(56) References Cited

U.S. PATENT DOCUMENTS

| | | | |
|---|---|---|---|
| 3,554,530 A | 1/1971 | Moore | |
| 3,622,145 A | 11/1971 | Gibson | |
| 4,045,010 A | 8/1977 | Arnold | |
| 4,186,916 A * | 2/1980 | Varga | B23Q 3/066 269/303 |
| 4,476,757 A * | 10/1984 | Morris | B23D 47/04 83/420 |
| 5,499,802 A | 3/1996 | Haberle | |

FOREIGN PATENT DOCUMENTS

FR        1151478 A      1/1958

OTHER PUBLICATIONS

Rockler; Rockler Long Stop for Rockler T-Track System; Feb. 29, 2024; https://www.rockler.com/rockler-long-stop-for-rockler-t-track-system; pp. 1-4; Medina, MN.
Red House Tools; Multi-Angle Swivel Stop Block—Universal T-track Compatible; Feb. 29, 2024; https://redhousetools.com/products/swivel-stop-block-kit; pp. 1-4; Johnstown, CO.
Mayagu; Woodworking DIY Tools Miter Track Stop For T-Slot T-Tracks Manual Durable In Use; Feb. 29, 2024; https://www.amazon.com/Woodworking-T-Slot-T-Tracks-Manual-Durable/dp/B06WWHSHVX; pp. 1-6.

* cited by examiner

*Primary Examiner* — Tyrone V Hall, Jr.
(74) *Attorney, Agent, or Firm* — Wolter VanDyke Davis, PLLC; Robert L. Wolter (57) ABSTRACT

An apparatus, including a guide body (100) having: a bottom surface (102) configured to rest flat atop a worktable; a guide side (200) including a guide contact feature with at least two guide points of contact (202A, 202B) that are configured to abut a flat side of a workpiece disposed on the worktable; and an alignment feature (400) that protrudes downward from the bottom surface. When the alignment feature aligns with a straight edge or a flat face of the worktable, work-surface distances (Da, Db) from the straight edge or from the flat face to each guide point of contact are the same. The apparatus further includes a through hole (500) that passes through a top surface (502) and through the bottom surface (102) and that is disposed between the guide contact feature and the alignment feature.

20 Claims, 12 Drawing Sheets

EDGE GUIDE

FIELD OF THE INVENTION

The invention relates to an edge guide suitable for positioning workpieces on a worktable.

DETAILED DESCRIPTION OF THE INVENTION

The present inventor has devised a unique and innovative edge guide suitable for holding a workpiece in a fixed position on a worktable. The edge guide disclosed herein is particularly suitable for machining operations, including CNC machining operations that rely on reference points such as an edge of a worktable.

FIG. 1A to FIG. 1D are various views of an example embodiment of an edge guide disclosed herein.

In an example embodiment, the guide body 100 includes a bottom surface 102 configured to define a bottom plane 104 that is configured to rest flat atop a worktable; and a guide side 200 that is oriented transverse to the bottom plane 104 and that includes at least two guide points of contact 202A, 202B. The at least two guide points of contact 202A, 202B are disposed above the bottom surface 102 and configured to abut a flat side of a workpiece disposed on the worktable. The at least two guide points of contact 202A, 202B may be embodied discreetly. For example, there may be at least two geometric peaks, or at least two pads etc., each including a respective guide point of contact that is configured to abut the side of the workpiece. In the example embodiment shown, the at least two guide points of contact 202A, 202B are part of guide contact ridge 202 that is disposed above the bottom surface 102. The guide contact ridge 202 may be continuous as shown, or may be discontinuous, such as being formed by a series of pads or the like that together form the guide contact ridge 202. A guide contact ridge 202 provides a relatively good grip on the workpiece compared to a smooth and flat surface. The at least two guide points of contact 202A, 202B constitute a guide contact feature. Similarly, the guide contact ridge 202 constitutes a guide contact feature.

An additional guide side 300 is disposed opposite the guide side 200, is oriented transverse to the bottom plane 104, and includes at least two additional guide points of contact 302A, 302B. The at least two additional guide points of contact 302A, 302B are disposed above the bottom surface 102 and configured to abut a flat side of a workpiece disposed on the worktable. The at least two additional guide points of contact 302A, 302B may be embodied discreetly. For example, there may be at least two geometric peaks, or at least two pads, each including a respective additional guide point of contact that is configured to abut the side of the workpiece. In the example embodiment shown, the at least two additional guide points of contact 302A, 302B are part of an additional contact ridge 302. The additional contact ridge 302 may be continuous as shown, or may be discontinuous, such as being formed by a series of pads or the like that together form the additional contact ridge 302.

An alignment feature 400 protrudes downward from the bottom surface 102. The alignment feature 400 includes an alignment feature inward side 402 that is oriented transverse to the bottom plane 104 and that defines at least two alignment points of contact 402A, 402B, 402C, 402D, 402E, 402F. The alignment feature 400 further includes and an alignment feature outward side 404 that is oriented transverse to the bottom plane 104, that is disposed opposite the alignment feature inward side 402, and that defines at least two additional alignment points of contact 404A, 404B. The at least two additional alignment points of contact 404A, 404B may be embodied discreetly. For example, there may be at least two geometric peaks, or at least two pads, each including a respective additional alignment point of contact like the alignment points of contact 402A, 402B, 402C, 402D, 402E, 402F. In the example embodiment shown, the at least two additional alignment points of contact 404A, 404B are part of the alignment feature outward side 404.

Through holes 500 pass through a top surface 502 and through the bottom surface 102 and are disposed between the guide contact ridge 202 and the alignment feature 400. In this example embodiment, the through holes 500 are embodied as slots, although this is not necessary. A widened section 500W surrounding a portion of the through hole 500 is suitable for a fastener having relatively a small head.

An optional inward relief step 600 is disposed above the guide contact ridge 202 to allow clearance for a machine tool.

Figures 1A, 1B:
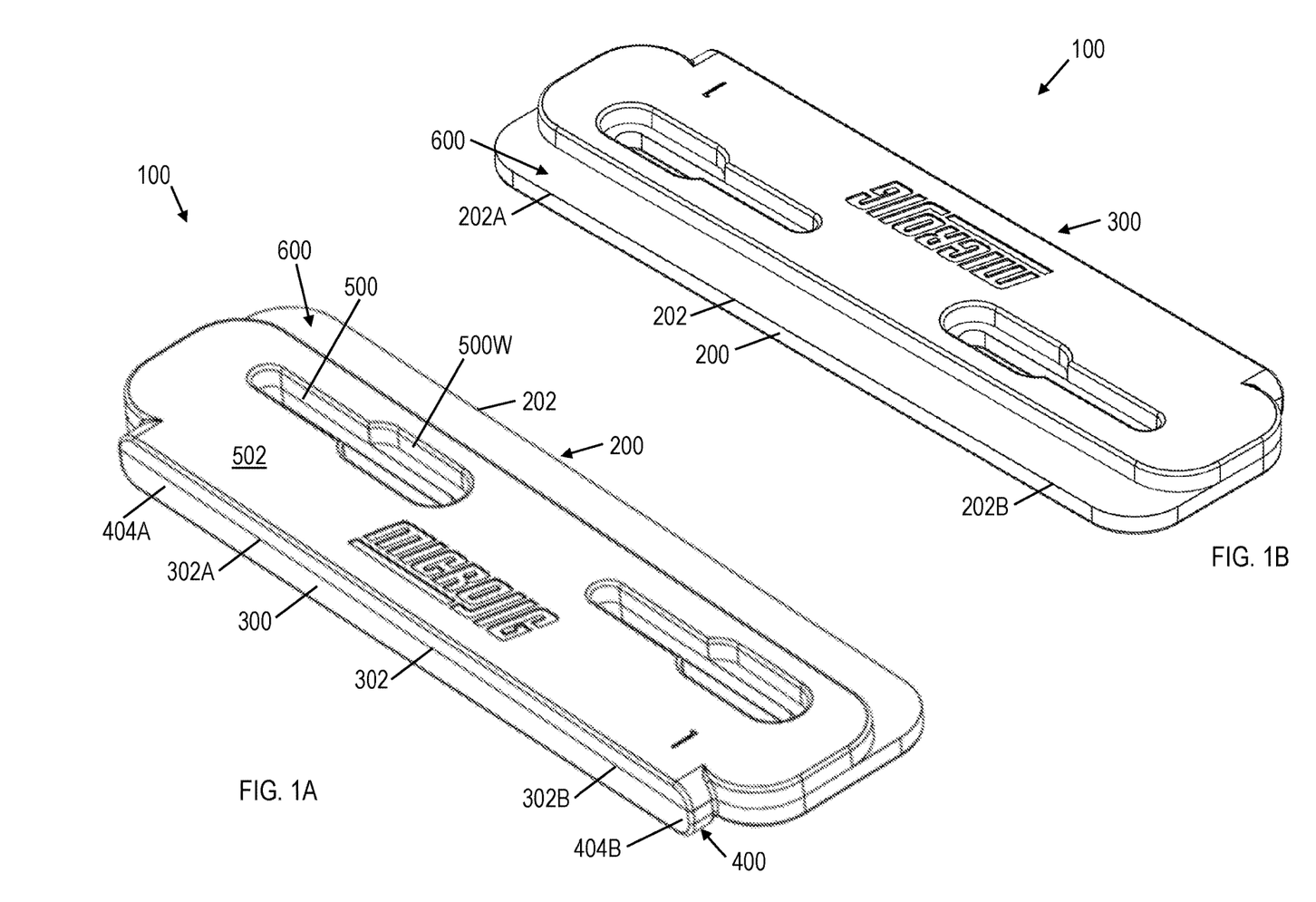
FIG. 1A to FIG. 1D are various views of an example embodiment of an edge guide disclosed herein.
Figure 1C:
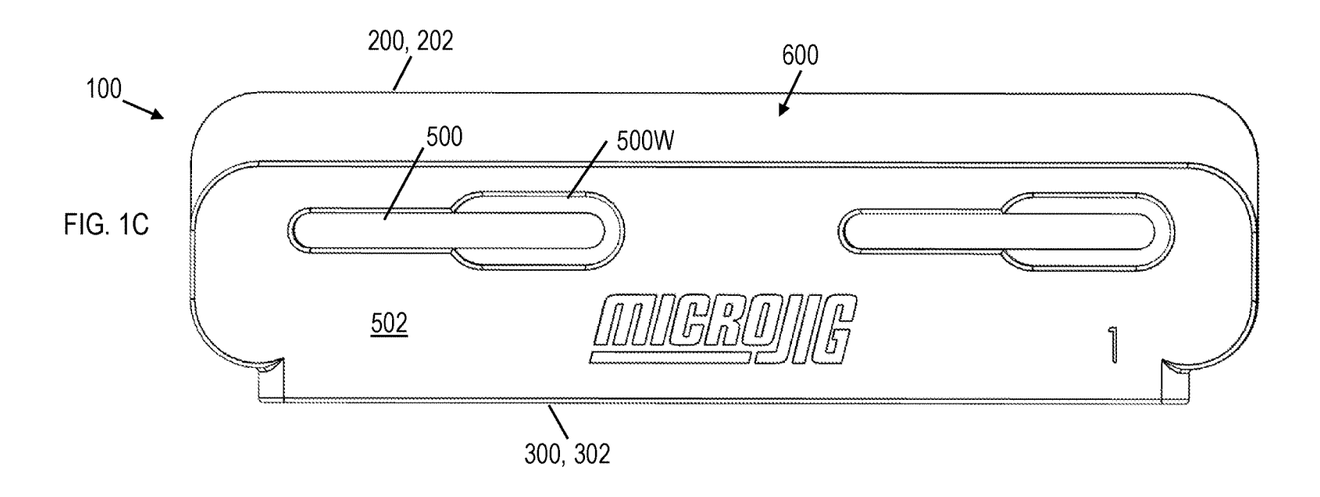
Figure 1D:
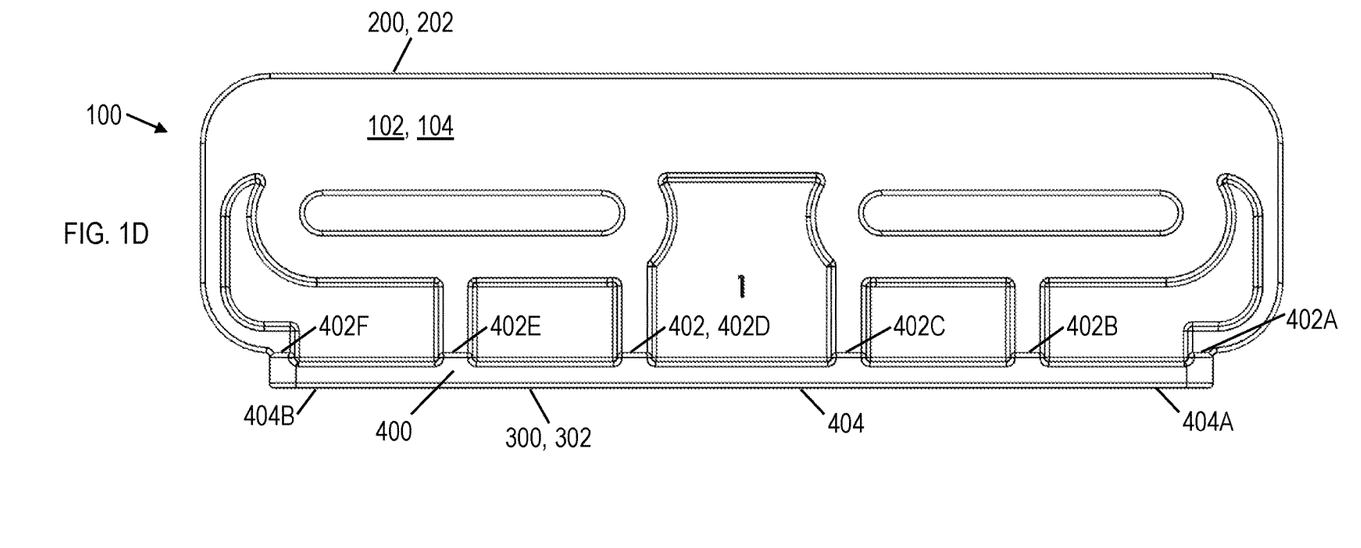
Figure 2A:
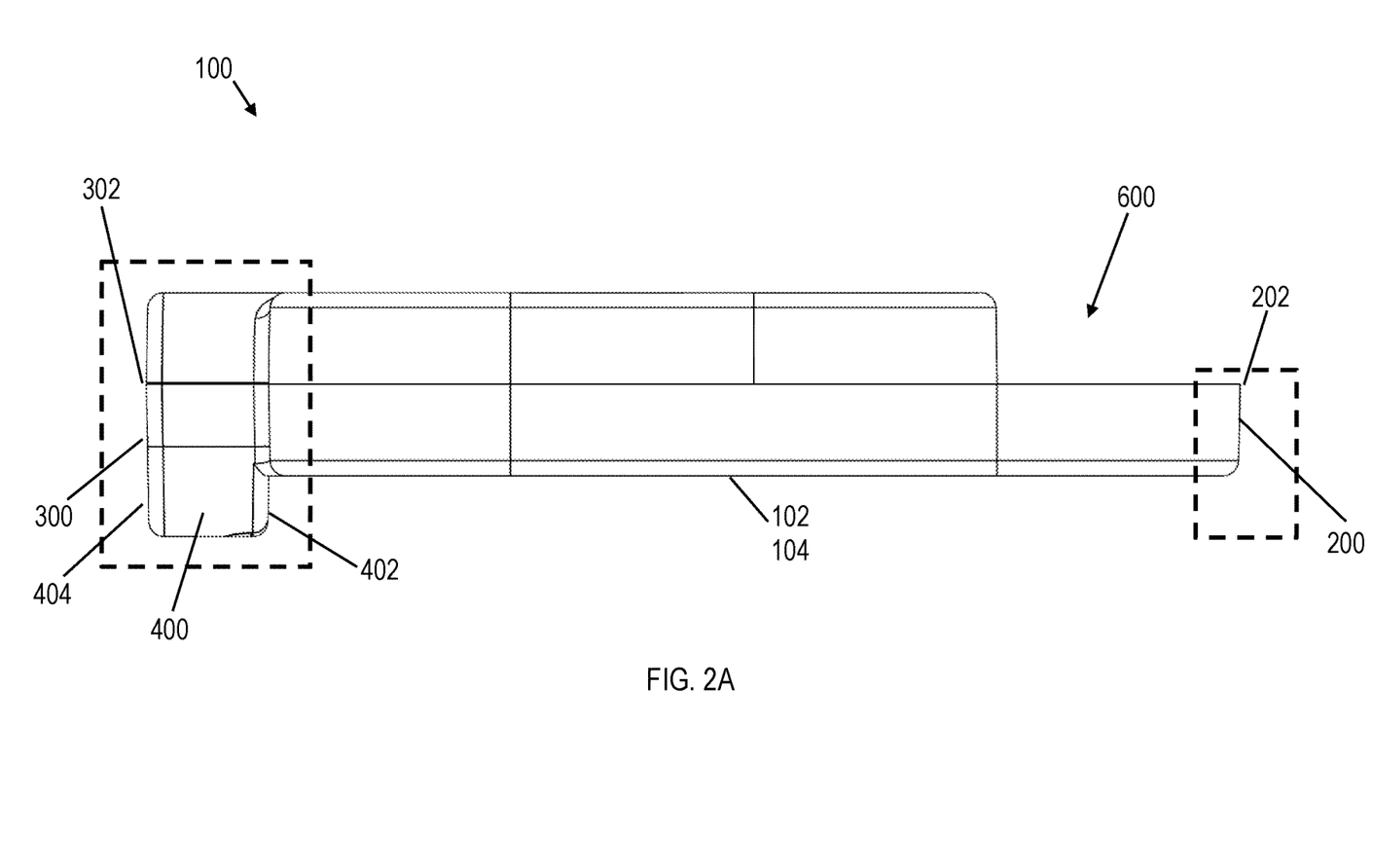
FIG. 2A is a side view of the edge guide of FIG. 1A.
Figure 2B:
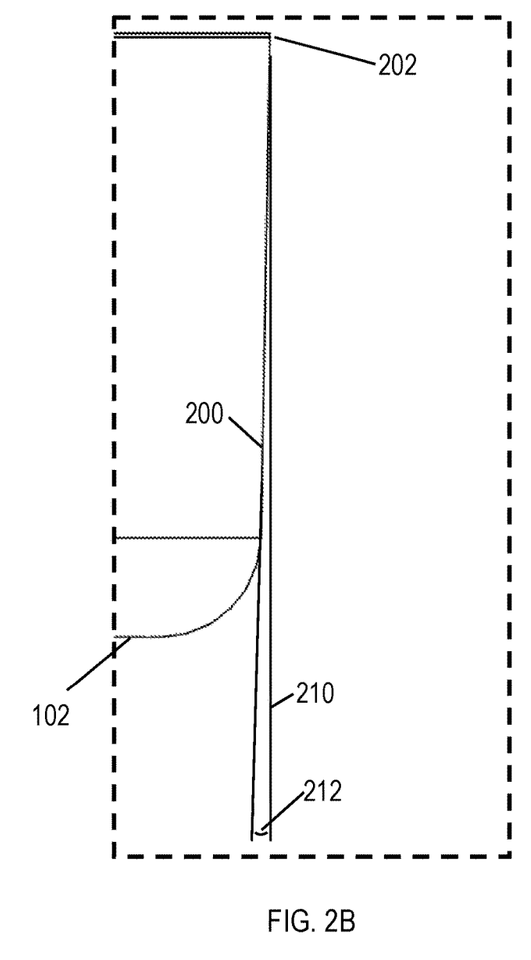
FIG. 2B and FIG. 2C are closeup views of areas indicated in FIG. 2A.
Figure 2C:
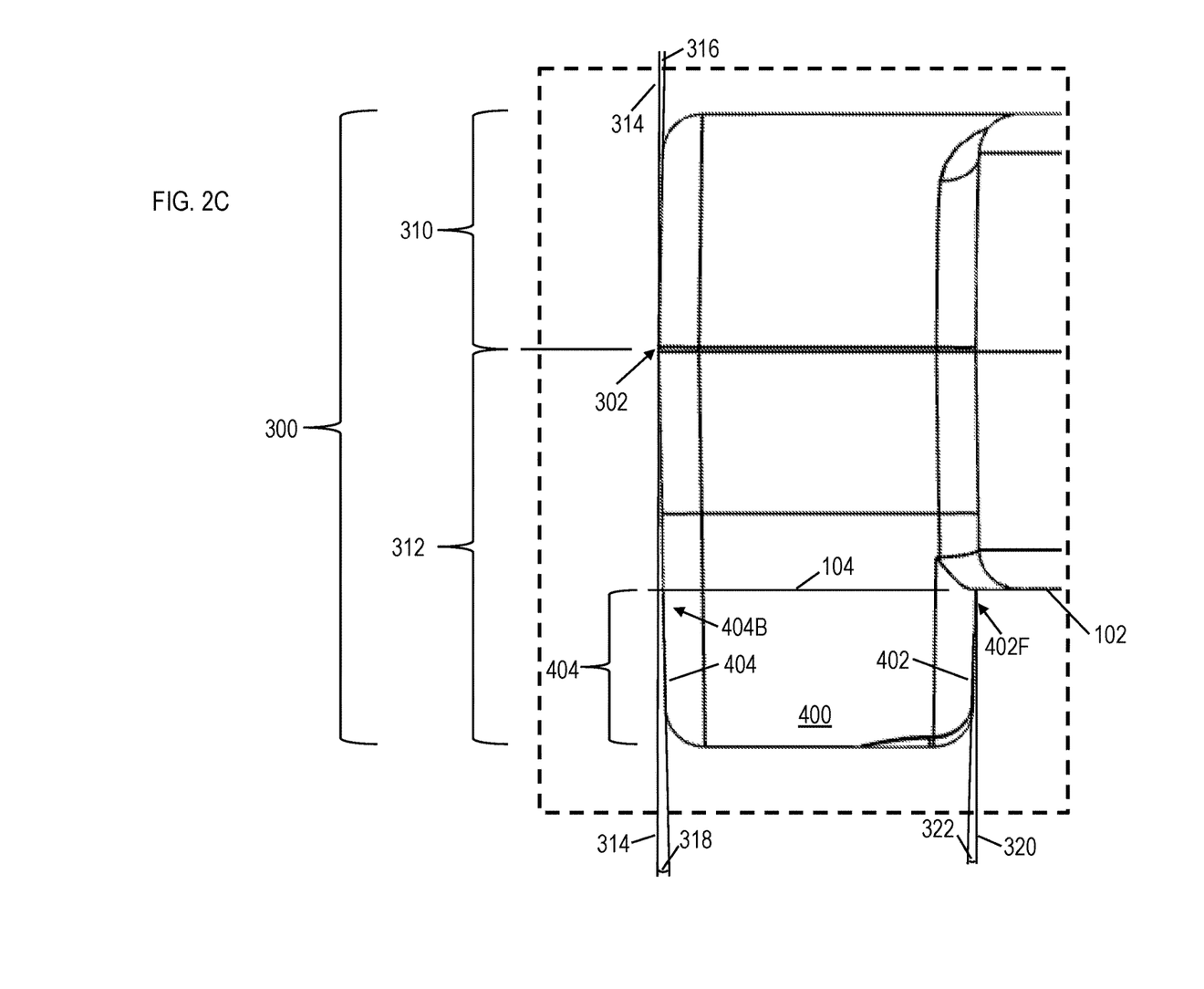

FIG. 2A is a side view of the edge guide of FIG. 1A. FIG. 2B is a closeup view of the guide side 200 indicated in FIG. 2A. FIG. 2C is a closeup view of the additional guide side 300 indicated in FIG. 2A.

When the bottom surface 102 of the guide body 100 is disposed on a horizontal surface, the guide side 200 tapers inward relative to a vertical line 210 at a taper angle 212. In an example embodiment, the taper angle 212 is less than five (5) degrees. In an example embodiment, the taper angle 212 is three (3) degrees, though the artisan understands that various other taper angles may be suitable.

As can be seen in FIG. 2C, the additional guide side 300 includes an upper portion 310 of the additional guide side 300 and a lower portion 312 of the additional guide side 300. The lower portion 312 of the additional guide side 300 includes the alignment feature outward side 404.

When the bottom surface 102 of the guide body 100 is disposed on a horizontal surface, the upper portion 310 of the additional guide side 300 tapers inward from the additional contact ridge 302 and relative to a vertical line 314 at a taper angle 316. In an example embodiment, the taper angle 316 is less than five (5) degrees. In an example embodiment, the taper angle 316 is three (3) degrees, though the artisan understands that various other taper angles may be suitable.

When the bottom surface 102 of the guide body 100 is disposed on a horizontal surface, the lower portion 312 of the additional guide side 300 tapers inward from the additional contact ridge 302 and relative to the vertical line 314 at a taper angle 318. In an example embodiment, the taper angle 318 is less than five (5) degrees. In an example embodiment, the taper angle 318 is three (3) degrees, though the artisan understands that various other taper angles may be suitable.

When the bottom surface 102 of the guide body 100 is disposed on a horizontal surface, the alignment feature outward side 404 tapers inward from the additional contact ridge 302 and relative to the vertical line 314 at the taper angle 318. In this example embodiment, the alignment feature outward side 404 is coplanar with the lower portion 312 of the additional guide side 300.

When the bottom surface 102 of the guide body 100 is disposed on a horizontal surface, the alignment feature inward side 402 tapers (outward) relative to a vertical line 320 at the taper angle 322. In an example embodiment, the taper angle 322 is less than five (5) degrees. In an example embodiment, the taper angle 322 is three (3) degrees, though the artisan understands that various other taper angles may be suitable.

In this example embodiment, the alignment feature outward side 404 and the alignment feature inward side 402 taper toward each other with increasing distance from the bottom surface 102.

In this example embodiment, the taper angle 318 and the taper angle 322 are the same, although this is not necessary.

Figure 3A:
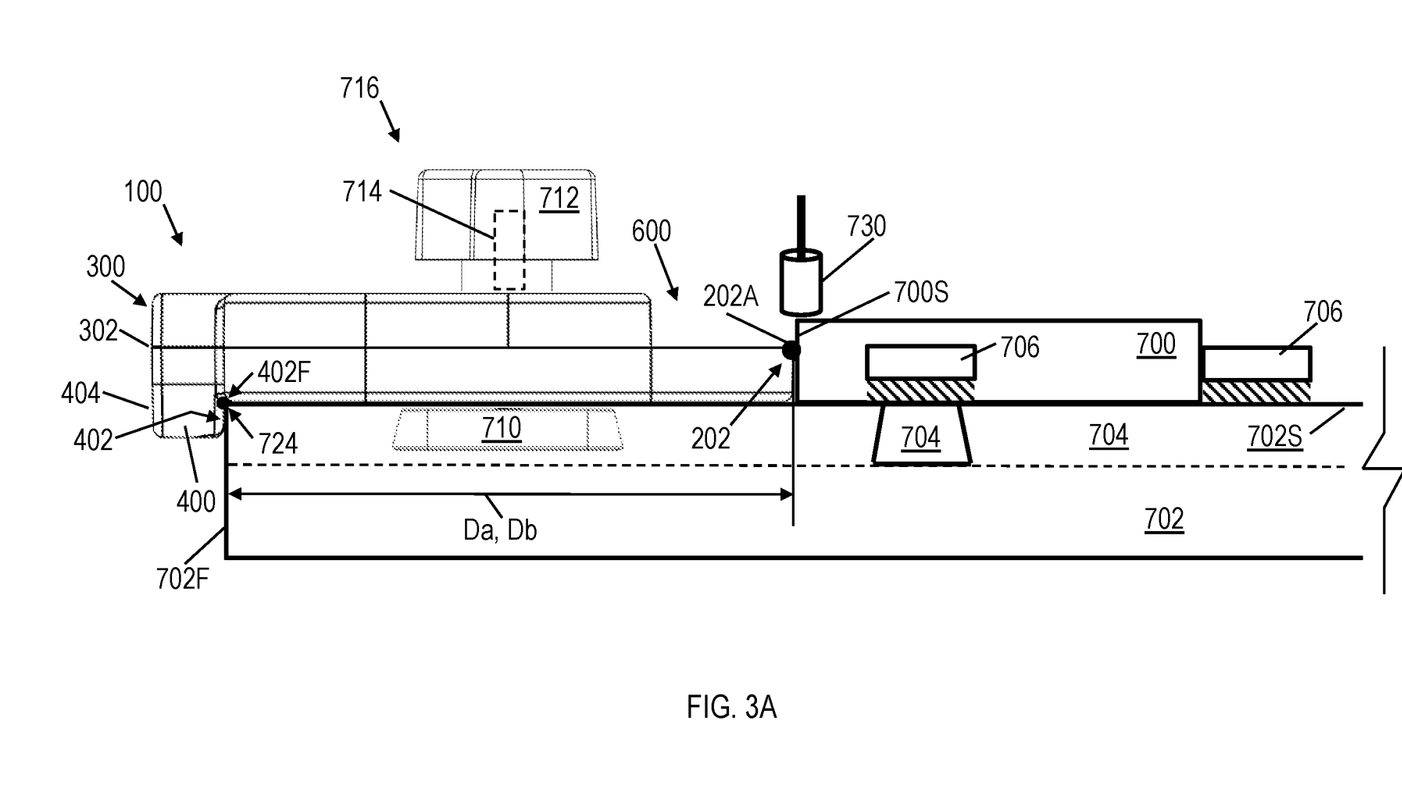
FIG. 3A is a side view showing the edge guide of FIG. 1A in an edge-referenced guiding configuration.
Figure 3B:
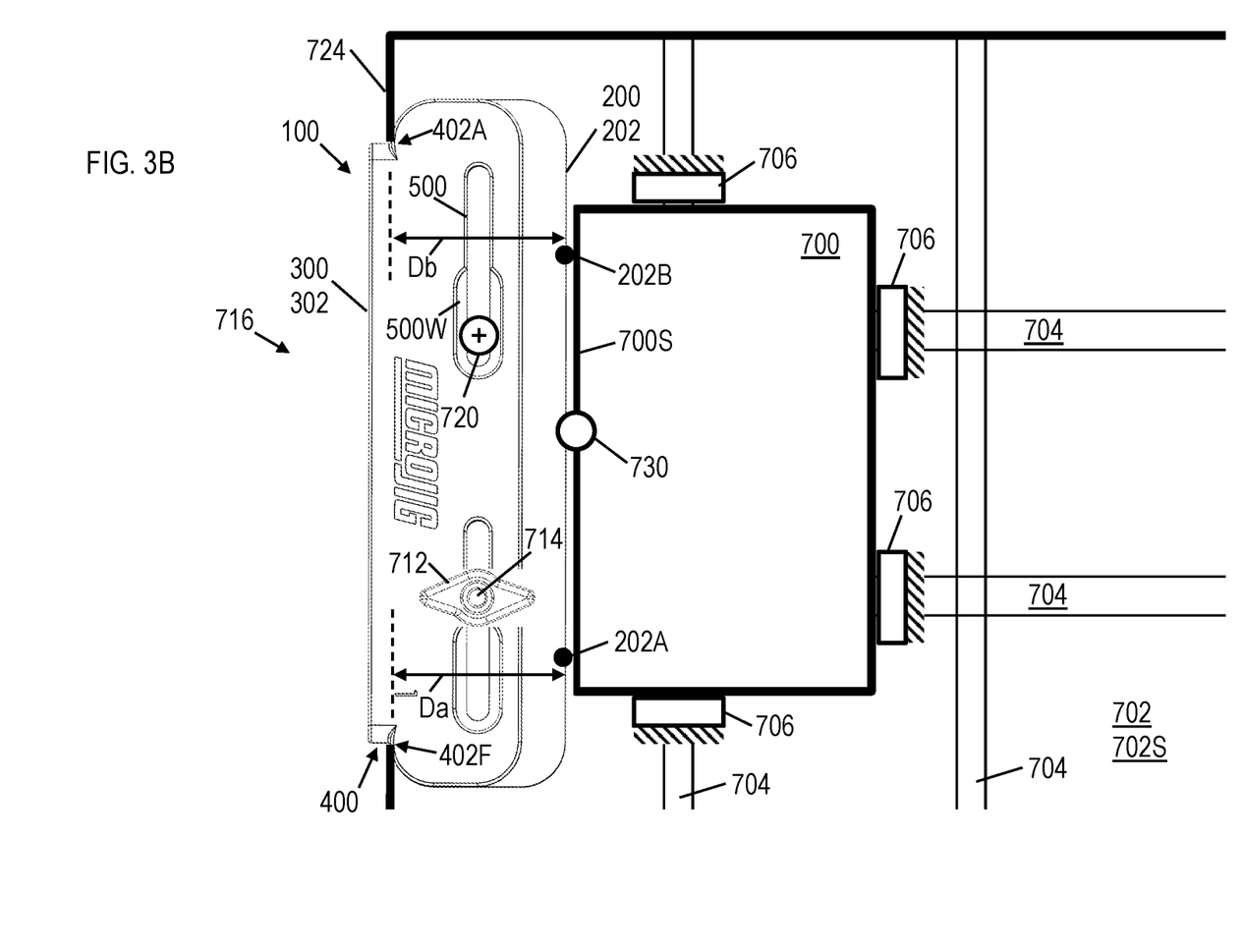
FIG. 3B is a top view of the edge guide of FIG. 1A in the edge-referenced guiding configuration of FIG. 3A.
Figure 4:
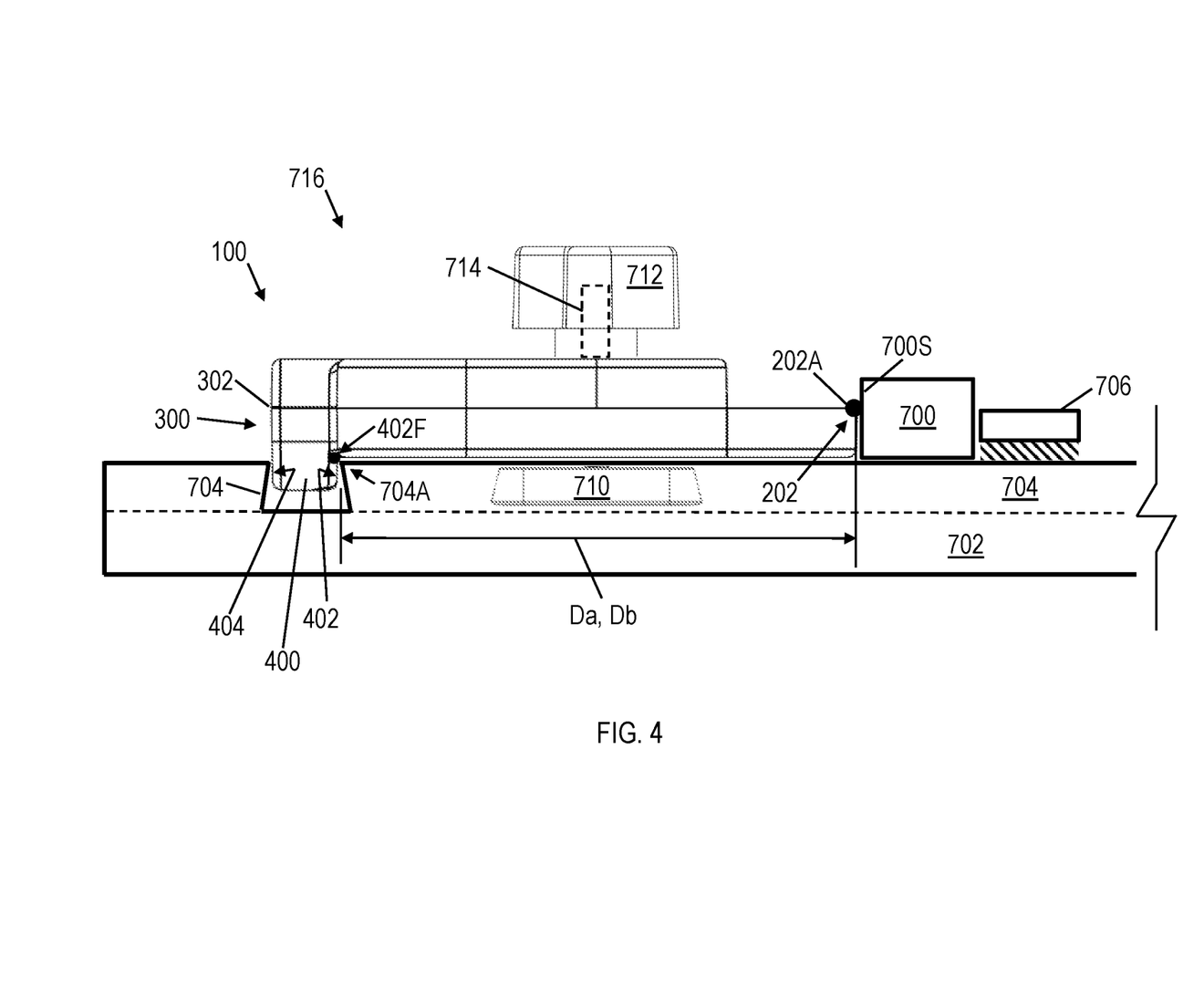
FIG. 4 is a side view showing the edge guide of FIG. 1A in a slot-referenced guiding configuration.
Figure 5:
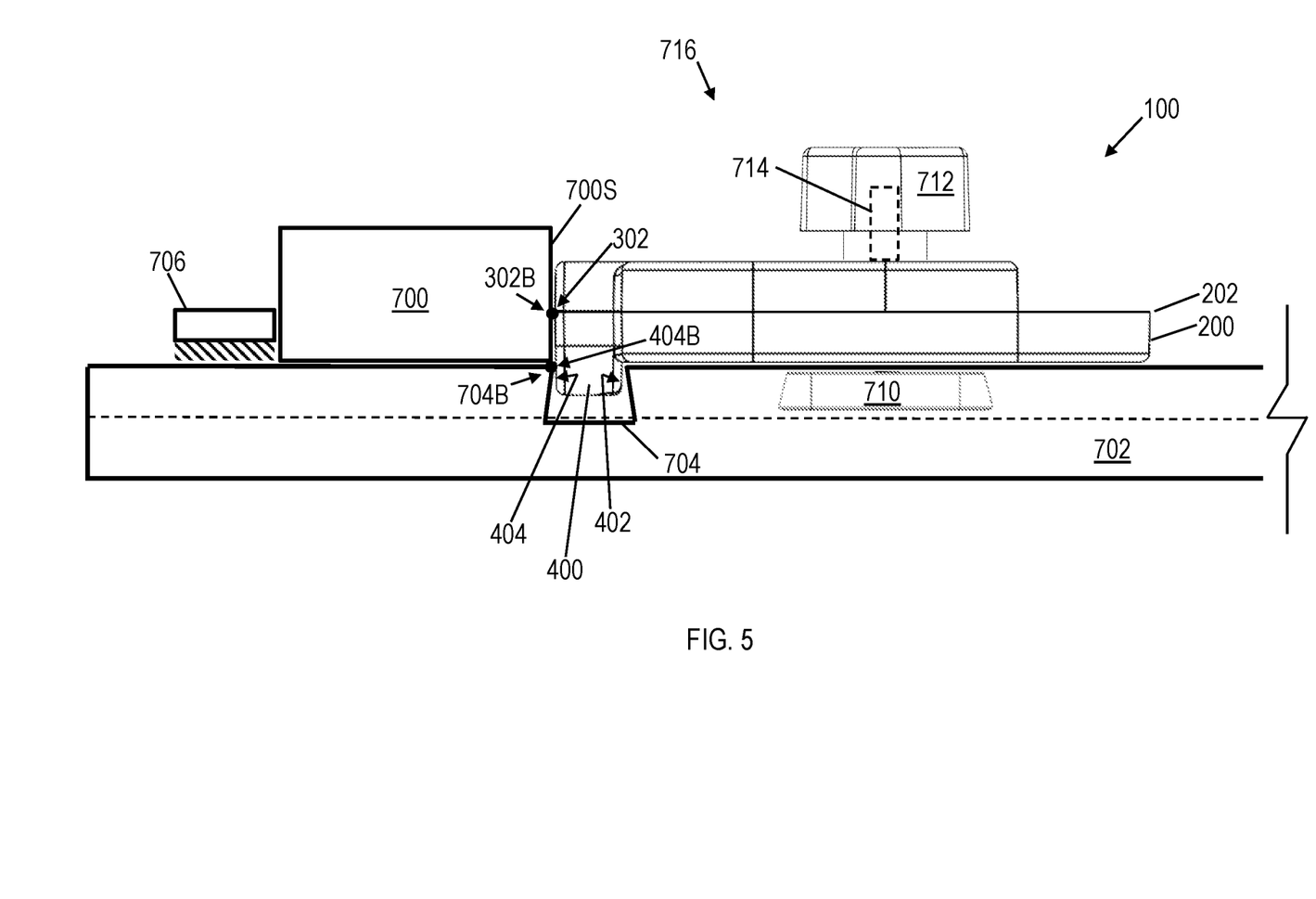
FIG. 5 is a side view showing the edge guide of FIG. 1A in an alternate slot-referenced guiding configuration.

FIG. 3A is a side view showing the guide body 100 of FIG. 1A in an edge-referenced guiding configuration. FIG. 3B is a top view of the guide body 100 of FIG. 1A in the edge-referenced guiding configuration of FIG. 3A. FIG. 4 is a side view showing the guide body 100 of FIG. 1A in a slot-referenced guiding configuration. FIG. 5 is a side view showing the guide body 100 of FIG. 1A in an alternate slot-referenced guiding configuration. These guiding configurations are not meant to be limiting.

In each of these guiding configurations, a workpiece 700 sits on a worktable 702 having slots 704 and the guide body 100 abuts a respective different edge of the workpiece 700. The workpiece 700 is held in place by the guide body 100 and at least one fixed element 706. The guide body 100 is held in place using an anchor nut 710, a tightening nut 712, and a threaded stud 714. The threaded stud 14 is secured to the anchor nut 710 and passes through the through hole 500. Tightening the tightening nut 712 on the threaded stud 714 draws the anchor nut 710 upward until the guide body 100 is clamped into position. The guide body 100 together with the anchor nut 710, the tightening nut 712, and the threaded stud 714 constitute an edge guide assembly 716.

In FIG. 3B, a small head fastener 720 is alternately used with a female threaded anchor nut (not shown).

The slot 704 may be a dovetail slot formed via a conventional ½"×14° dovetail router bit. The anchor nut 710 may likewise have a dovetail shape configured to fit within the dovetail slot 704. The fixed element 706 may be relative to the worktable 702 in any way known to the artisan, including being fixed to the slots 704.

In FIG. 3A and FIG. 3B, the alignment points of contact 402A, 402B, 402C, 402D, 402E, 402F of the alignment feature inward side 402 are positioned to abut a (horizontal and straight) outside corner 724 of the (horizontal) worktable 702. This aligns the alignment feature inward side 402 with the outside corner 724 of the worktable 702. The guide contact ridge 202 also abuts the workpiece 700.

When the alignment feature inward side 402 aligns with the outside corner 724 of the worktable 702, and as seen in FIG. 3B, a shortest distance Da from the outside corner 724 of the worktable 702 to guide point of contact 202A is equal to a shortest distance Db from the outside corner 724 of the worktable 702 to guide point of contact 202B. In this way, the guide body 100 ensures a side 700S of the workpiece 700 is oriented parallel to the outside corner 724 of the worktable 702.

Distances Da and Db are defined herein to be worksurface distances. A worksurface distance is a distance from an edge of the worktable 702 to an item along a line that is perpendicular to the edge and that remains within a plane defined by an upper surface 702S of the worktable. Stated another way, the worksurface distance is a shortest distance from the edge of the worktable 702 and parallel to the worksurface.

Stated yet another way, when the upper surface 702S is horizontal, the worksurface distance Da is a horizontal component of a shortest distance from the outside corner 724 of the worktable 702 to the guide point of contact 202A. Likewise, when the upper surface 702S is horizontal, the worksurface distance Db is a horizontal component of a shortest distance from the outside corner 724 of the worktable 702 to the guide point of contact 202B.

Worksurface distances Da, Db in FIG. 3B are thereby equal regardless of whether the guide points of contact 202A, 202B are at a same elevation above the upper surface 702S or are at different elevations above the upper surface 702S. This, in turn, allows the guide points of contact 202A, 202B to be at different elevations above the upper surface 702S while still ensuring the side 700S of the workpiece 700 is parallel to the outside corner 724 of the worktable 702.

When the points of contact 202A, 202B are part of the guide contact ridge 202, then the guide contact ridge 202 is parallel to the outside corner 724 of the worktable 702 as viewed in FIG. 3B. When the guide contact ridge 202 is parallel to the outside corner 724 of the worktable 702 as viewed in FIG. 3B, the guide contact ridge 202 may be parallel to the upper surface 702S, or the guide contact ridge 202 may be oriented in and out of the page as viewed in FIG. 3B. In the example embodiment shown, the guide contact ridge 202 is parallel to the outside corner 724 of the worktable 702 and parallel to the upper surface 702S as viewed in FIG. 3B and is thereby parallel to the outside corner 724 of the worktable 702 in all views.

In the example embodiment shown in FIG. 3A and FIG. 3B, alignment feature inward side 402 tapers at taper angle 322 away from the outside corner 724 of the worktable 702. Hence, the alignment points of contact 402A, 402B, 402C, 402D, 402E, 402F only contact the outside corner 724 of the worktable 702. However, it is possible that the taper angle 322 is zero, in which case the alignment points of contact 402A, 402B, 402C, 402D, 402E, 402F will contact a (vertical and flat) face 702F of the worktable 702. In that case, the alignment points of contact 402A, 402B, 402C, 402D, 402E, 402F need not be disposed exactly at the outside corner 724 of the worktable 702. Instead, one or more of the alignment points of contact 402A, 402B, 402C, 402D, 402E, 402F can contact the face 702F at respective different vertical distances below the upper surface 702S.

Regardless of exactly how the alignment feature 400 makes contact with the outside corner 724 of the worktable 702 or the face 702F, once the alignment is established, the worksurface distances Da, Db, from the outside corner 724 of the worktable 702 or the face 702F will be the same.

In the example embodiment shown, once the alignment is established, the guide contact ridge 202 and the additional contact ridge 302 will be parallel to the outside corner 724 of the worktable 702 and will be parallel to each other. The same applies when the alignment points of contact 402A, 402B, 402C, 402D, 402E, 402F contact the face 702F.

The at least two guide points of contact 202A, 202B constitute a guide contact feature. Similarly, the guide contact ridge 202 constitutes a guide contact feature. Any feature that can be aligned with the outside corner 724 of the worktable 702 or the face 702F can constitute a guide contact feature.

Also visible in FIG. 3A is a machine tool 730. The low profile made possible by the inward relief step 600 permits the machine tool 730 to travel past the workpiece 700 and over the guide body 100 without damaging the guide body 100.

In FIG. 4, the alignment points of contact 402A, 402B, 402C, 402D, 402E, 402F of the alignment feature inward side 402 are positioned to abut a first corner 704A of the slot 704. This aligns the alignment feature inward side 402 with the first corner 704A of the slot 704. The guide contact ridge 202 also abuts the workpiece 700. The principles related to this guiding configuration are, mutatis mutandis, the same as those discussed in relation to FIG. 3A and FIG. 3B.

In FIG. 5, the two additional alignment points of contact 404A, 404B of the alignment feature outward side 404 are positioned to abut a second corner 704B of the slot 704. This aligns the alignment feature outward side 404 with the second corner 704B of the slot 704 which, in turn, aligns (makes parallel) the additional contact ridge 302 with the second corner 704B of the slot 704. The additional contact ridge 302 also abuts the workpiece 700 and this aligns the side 700S of the workpiece with the second corner 704B of the slot 704.

The principles related to this guiding configuration are, mutatis mutandis, the same as those discussed in relation to FIG. 3A, FIG. 3B, and FIG. 4.

When the alignment feature outward side 404 aligns with the second corner 704B of the slot 704, worksurface distances Da, Db to the at least two additional guide points of contact 302A, 302B are present and are equal to each other, although they are too small to show. In this way, the guide body 100 ensures the side 700S of the workpiece 700 is parallel to the second corner 704B of the slot 704.

The example embodiment of FIG. 4 and FIG. 5 discuss contact between the alignment feature inward side 402 and the first corner 704A of the slot 704 and contact between the alignment feature outward side 404 and the second corner 704B separately. However, it is also possible to configure the alignment feature 400 so that the alignment feature inward side 402 and the alignment feature outward side 404 respectively contact the first corner 704A and the second corner 704B simultaneously.

In an alternate example embodiment, the alignment feature 400 is configured to be slightly wider than a width of the opening of the slot 704. In such an example embodiment, the wider width of the alignment feature 400 will prevent the alignment feature 400 from fully seating in the slot 704. This, in turn, will prevent the bottom surface 102 of the guide body 100 from resting flush with the upper surface 702S of the worktable 702. However, the tight fit of the alignment feature 400 in the slot 704 will ensure the alignment feature 400 securely aligns with the slot 704. Moreover, it is not necessary that the bottom surface 102 of the guide body 100 rest flush with the upper surface 702S of the worktable 702 to achieve the alignment function.

Figure 6A:
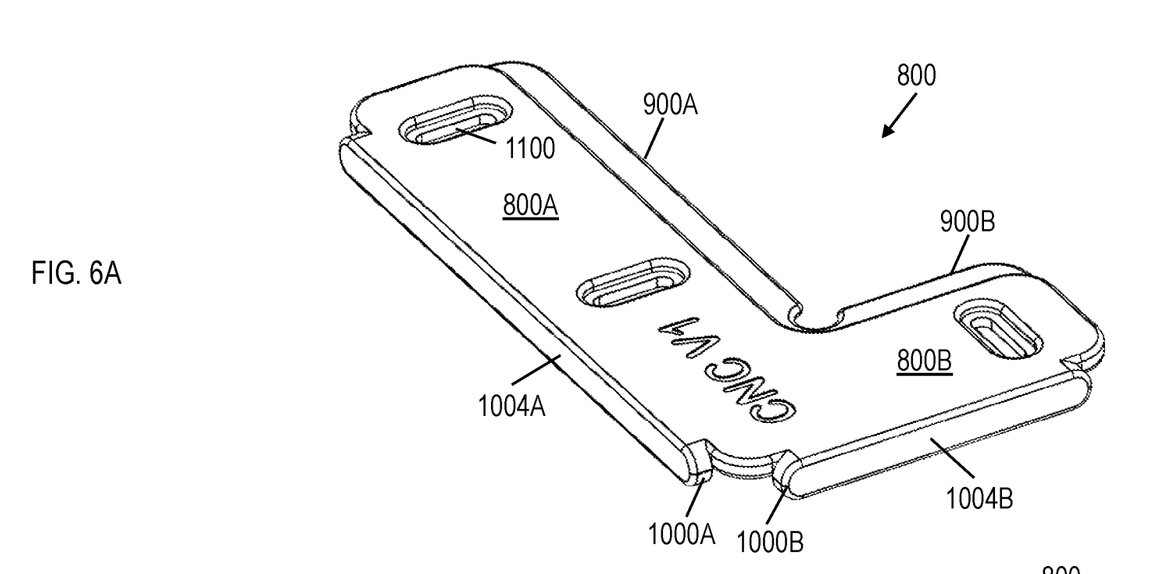
FIG. 6A to FIG. 6C are various views of an alternate example embodiment of the edge guide disclosed herein.
Figure 6B:
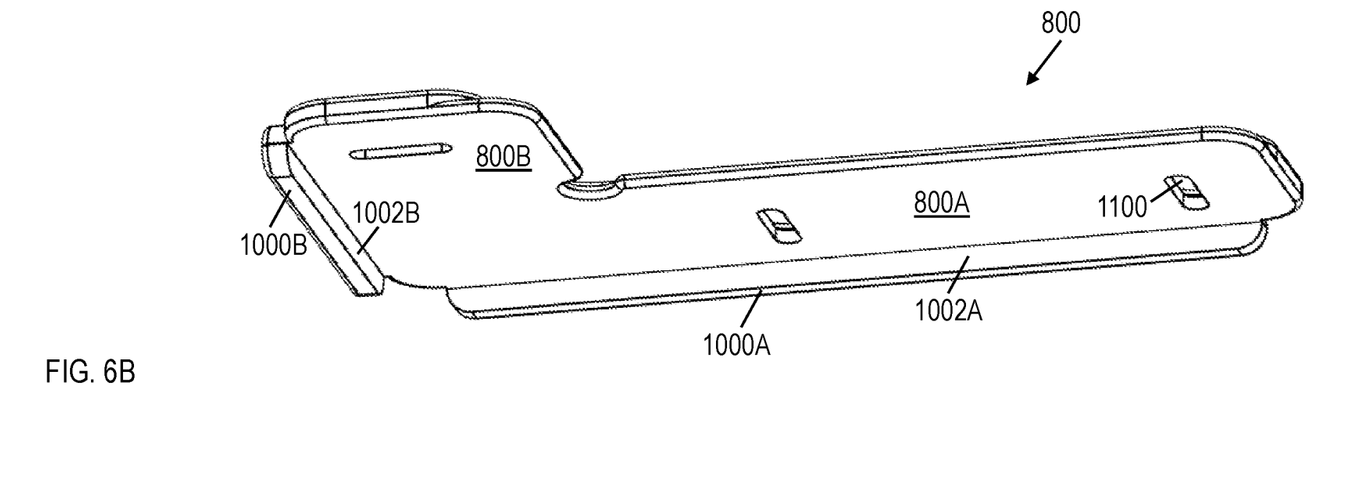
Figure 6C:
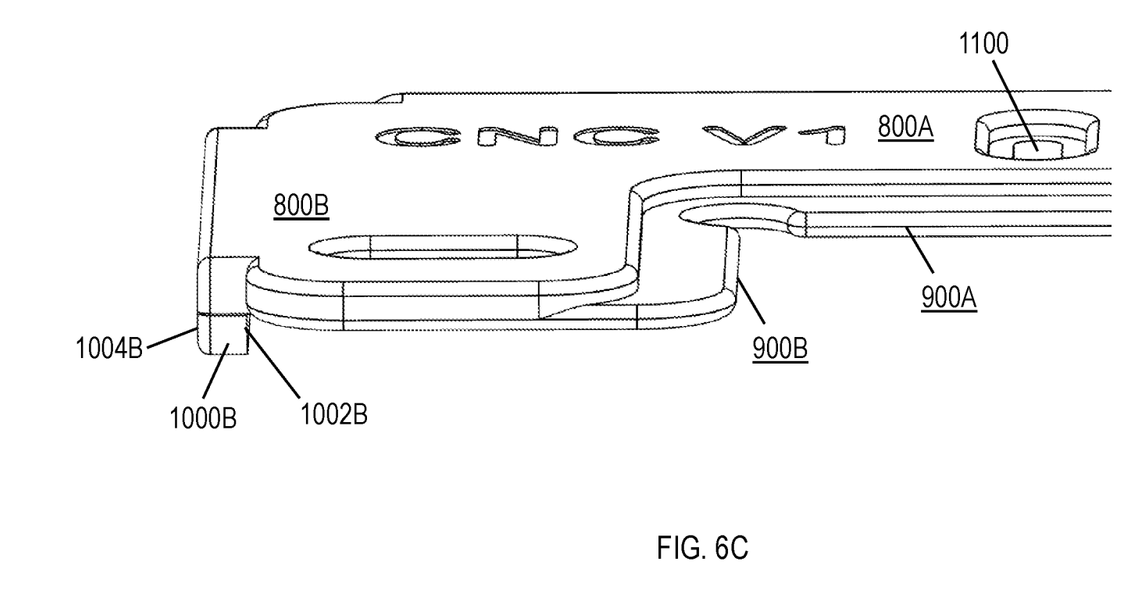

FIG. 6A to FIG. 6C are various views of an alternate example embodiment of an guide body 800 disclosed herein. The guide body 800 is L-shaped and each segment 800A, 800B of the L-shape is similar to the guide body 100 of FIG. 1A. The disclosure above related to the guide body 100 thereby applies, mutatis mutandis, to each segment 800A, 8000B individually.

Segment 800A includes a contact ridge 900A and an alignment feature 1000A. Segment 800B includes a contact ridge 900B and an alignment feature 1000B. Alignment feature 1000A includes an alignment feature inward side 1002A and an alignment feature outward side 1004A. Alignment feature 1000B includes an alignment feature inward side 1002B and an alignment feature outward side 1004B. Both segments 800A, 800B include through holes 1100.

In this example embodiment, the alignment feature inward sides 1002A, 1002B are both. When the bottom surface 802 of the guide body 800 rests on a horizontal work surface, the alignment feature inward sides 1002A, 1002B are oriented vertically and perpendicular to each other. In alternate example embodiments, either or both of the alignment feature inward sides 1002A, 1002B may have as few as two points of contact because only two points of contact are necessary to align the respective alignment feature 1000A, 1000B with the slot 704.

Figure 7:
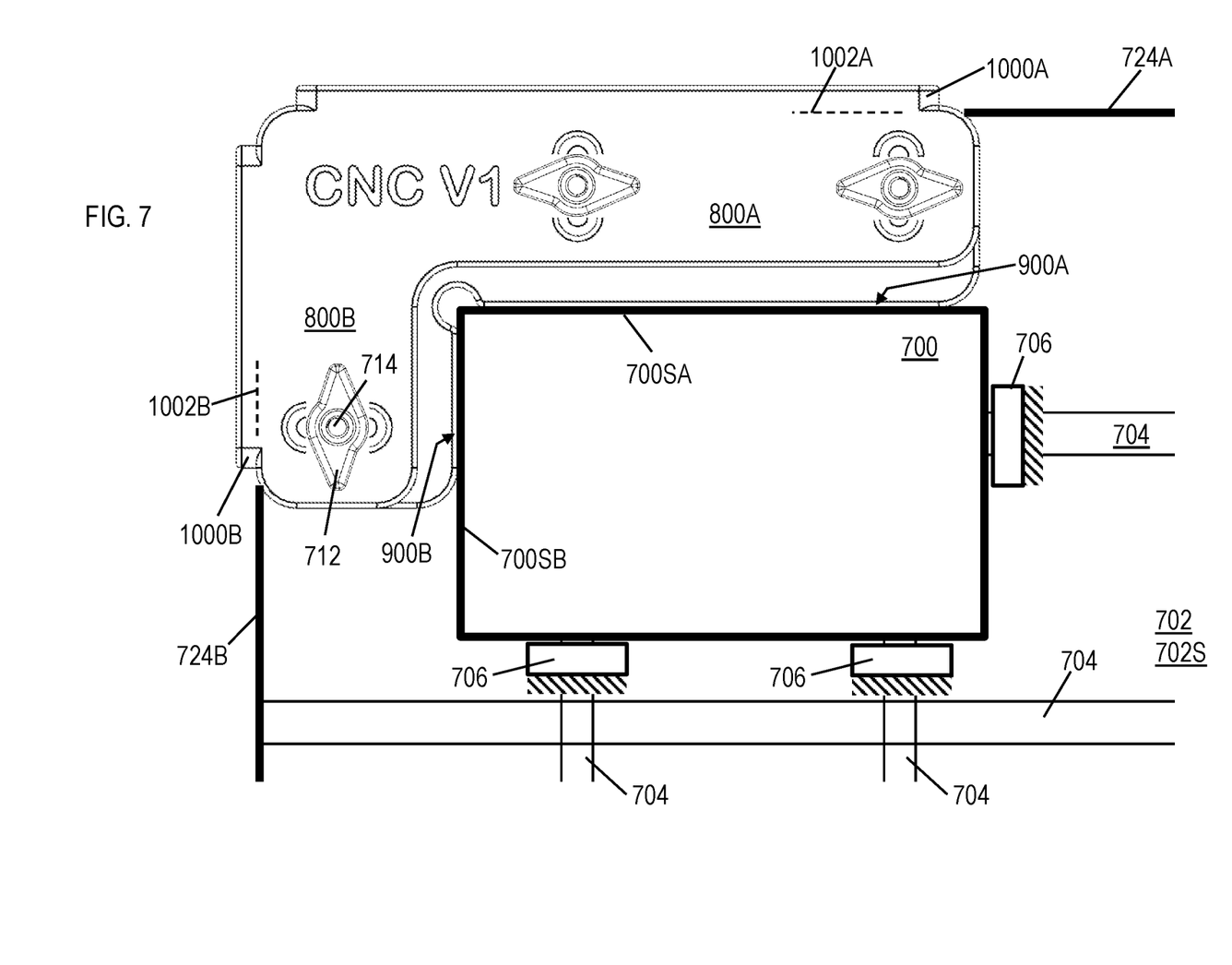
FIG. 7 is a top view of the edge guide of FIG. 6A in an edge-referenced guiding configuration.

FIG. 7 is a top view of the guide body 800 of FIG. 6A in an edge-referenced guiding configuration. When the alignment feature inward side 1002A abuts the outside corner 724A, the alignment feature 1000A aligns with the outside corner 724A. This, in turn, aligns the contact ridge 900A with the outside corner 724A. When the side 700SA of the workpiece 700 abuts the contact ridge 900A, the side 700SA of the workpiece 700 is then also aligned with the outside corner 724A.

Similarly, when the alignment feature inward side 1002B abuts the outside corner 724B, the alignment feature 1000B aligns with the outside corner 724B. This, in turn, aligns the contact ridge 900B with the outside corner 724B. When the side 700SB of the workpiece 700 abuts the contact ridge 900B, the side 700SB of the workpiece 700 is then also aligned with the outside corner 724B.

The edge guide 800 can also be placed in two perpendicular slots 704 in example embodiments where the through holes 1100 are positioned to coincide with respective slots 704 as necessary to enable anchoring of the guide body 800.

The invention claimed is:

1. An apparatus, comprising a guide body comprising:
    a bottom surface configured to rest flat atop a worktable;
    a guide side comprising a guide contact feature comprising at least two guide points of contact that are configured to abut a flat side of a workpiece disposed on the worktable;
    an alignment feature that protrudes downward from the bottom surface, wherein when the alignment feature aligns with a straight edge or a flat face of the worktable, worksurface distances from the straight edge or from the flat face to each guide point of contact of the at least two guide points of contact are the same; and
    a through hole that passes through a top surface and through the bottom surface and that is disposed between the guide contact feature and the alignment feature;
    wherein the guide body comprises an inward relief step above the guide contact feature.

2. The apparatus of claim 1,
    wherein the guide contact feature comprises a guide contact ridge comprising the at least two guide points of contact; and
    wherein the guide side tapers inward from the guide contact ridge toward the bottom surface.

3. The apparatus of claim 2,
wherein the guide contact ridge comprises a continuous contact ridge.

4. The apparatus of claim 1,
wherein the alignment feature comprises: an alignment feature inward side disposed closer to the guide side and configured to abut the straight edge or the flat face; and an alignment feature outward side disposed opposite the inward side.

5. The apparatus of claim 4,
wherein the alignment feature inward side is oriented transverse to a plane defined by the bottom surface.

6. The apparatus of claim 4,
wherein the alignment feature inward side and the alignment feature outward side taper toward each other with increasing distance from the bottom side.

7. The apparatus of claim 6,
wherein the alignment feature inward side is flat; and
wherein the alignment feature outward side is flat.

8. The apparatus of claim 1,
wherein the guide body further comprises an additional guide side disposed opposite the guide side;
wherein the additional guide side comprises at least two additional guide points of contact that are configured to abut a flat side of a workpiece disposed on the worktable; and
wherein when the alignment feature aligns with the straight edge or with the flat face of the worktable each additional guide point of contact of the at least two additional guide points of contact is equidistant from the straight edge or the flat face.

9. The apparatus of claim 8,
wherein the additional guide side comprises an additional contact ridge comprising the at least two additional guide points of contact.

10. The apparatus of claim 9,
wherein a lower portion of the additional guide side tapers inward from the additional contact ridge toward the alignment feature.

11. The apparatus of claim 10,
wherein the alignment feature comprises: an alignment feature inward side disposed closer to the guide side and configured to abut the straight edge or the flat face; and an alignment feature outward side disposed opposite the alignment feature inward side; and
wherein the lower portion of the additional guide comprises the alignment feature outward side.

12. The apparatus of claim 11, wherein the lower portion of the additional guide side is planar.

13. The apparatus of claim 10, wherein an upper portion of the second guide side tapers inward from the additional contact ridge with increasing distance from the bottom side.

14. An apparatus, comprising a guide body comprising:
a bottom surface configured to define a bottom plane;
a guide side that is oriented transverse to the bottom plane and that comprises a contact ridge that is disposed above the bottom surface;
an additional guide side that is disposed opposite the guide side, that is oriented transverse to the bottom plane, and that comprises an additional contact ridge that is disposed above the bottom surface and oriented parallel to the contact ridge;
an alignment feature that protrudes downward from the bottom surface and that comprises an alignment feature inward side that is oriented transverse to the bottom plane and extends parallel to the contact ridge; and
a through hole that passes through a top surface and through the bottom surface and that is disposed between the contact ridge and the alignment feature;
wherein the guide side tapers inward from the contact ridge toward the bottom surface; and
wherein a lower portion of the additional guide side tapers inward from the additional contact ridge toward the alignment feature.

15. The apparatus of claim 14, wherein the alignment feature further comprises an alignment feature outward side disposed opposite the inward side and that extends parallel to the contact ridge.

16. The apparatus of claim 14, wherein the lower portion of the additional guide side comprises the alignment feature outward side.

17. The apparatus of claim 14, wherein the guide body defines an L-shape and comprises an additional alignment feature that is perpendicular to the alignment feature.

18. An apparatus, comprising a guide body comprising:
a bottom surface configured to rest flat atop a worktable;
a guide side comprising a guide contact feature comprising at least two guide points of contact that are configured to abut a flat side of a workpiece disposed on the worktable;
an alignment feature that protrudes downward from the bottom surface, wherein when the alignment feature aligns with a straight edge or a flat face of the worktable, worksurface distances from the straight edge or from the flat face to each guide point of contact of the at least two guide points of contact are the same; and
a through hole that passes through a top surface and through the bottom surface and that is disposed between the guide contact feature and the alignment feature;
wherein the guide body further comprises an additional guide side disposed opposite the guide side;
wherein the additional guide side comprises at least two additional guide points of contact that are configured to abut a flat side of a workpiece disposed on the worktable; and
wherein when the alignment feature aligns with the straight edge or with the flat face of the worktable each additional guide point of contact of the at least two additional guide points of contact is equidistant from the straight edge or the flat face;
wherein the additional guide side comprises an additional contact ridge comprising the at least two additional guide points of contact;
wherein a lower portion of the additional guide side tapers inward from the additional contact ridge toward the alignment feature.

19. An apparatus, comprising a guide body comprising:
a bottom surface configured to define a bottom plane;
a guide side that is oriented transverse to the bottom plane and that comprises a contact ridge that is disposed above the bottom surface;
an additional guide side that is disposed opposite the guide side, that is oriented transverse to the bottom plane, and that comprises an additional contact ridge that is disposed above the bottom surface and oriented parallel to the contact ridge;
an alignment feature that protrudes downward from the bottom surface and that comprises an alignment feature inward side that is oriented transverse to the bottom plane and extends parallel to the contact ridge; and a through hole that passes through a top surface and through the bottom surface and that is disposed between the contact ridge and the alignment feature;

wherein the guide body defines an L-shape and comprises an additional alignment feature that is perpendicular to the alignment feature.

20. An apparatus, comprising a guide body comprising:

a bottom surface configured to rest flat atop a worktable;

a guide side comprising a guide contact feature comprising at least two guide points of contact that are configured to abut a flat side of a workpiece disposed on the worktable;

an alignment feature that protrudes downward from the bottom surface, wherein when the alignment feature aligns with a straight edge or a flat face of the worktable, worksurface distances from the straight edge or from the flat face to each guide point of contact of the at least two guide points of contact are the same; and a through slot that passes through a top surface and through the bottom surface, that is disposed entirely remote from both the guide contact feature and the alignment feature, and that extends parallel to the alignment feature.

\* \* \* \* \*